(12) United States Patent
Dupaquis

(10) Patent No.: US 7,788,311 B2
(45) Date of Patent: Aug. 31, 2010

(54) METHOD FOR FAST QUOTIENT GUESS AND CONGRUENCIES MANIPULATION

(75) Inventor: Vincent Dupaquis, Biver (FR)

(73) Assignee: Atmel Rousset S.A.S., Rousset Cedex (FR)

( * ) Notice: Subject to any disclaimer, the term of this patent is extended or adjusted under 35 U.S.C. 154(b) by 1097 days.

(21) Appl. No.: 11/442,922

(22) Filed: May 30, 2006

(65) Prior Publication Data

US 2007/0217602 A1    Sep. 20, 2007

(30) Foreign Application Priority Data

Feb. 28, 2006    (FR) .................................. 06 01781

(51) Int. Cl.
*G06F 7/72* (2006.01)
(52) U.S. Cl. ...................................... 708/492
(58) Field of Classification Search ................ None
See application file for complete search history.

(56) References Cited

U.S. PATENT DOCUMENTS

| 5,185,711 A | * | 2/1993 | Hattori | 708/492 |
| 5,615,220 A | | 3/1997 | Pharris | 371/37.1 |
| 5,799,088 A | * | 8/1998 | Raike | 380/30 |
| 5,954,788 A | | 9/1999 | Suh et al. | 708/491 |
| 6,470,369 B1 | * | 10/2002 | Ikegami | 708/491 |
| 6,523,053 B1 | | 2/2003 | Lee et al. | 708/492 |
| 2008/0019511 A1 | * | 1/2008 | Akiyama et al. | 380/30 |
| 2008/0109501 A1 | * | 5/2008 | Douguet et al. | 708/250 |

FOREIGN PATENT DOCUMENTS

| WO | WO 01/48706 A1 | 7/2001 |
| WO | WO 2004/111831 A2 | 12/2004 |

* cited by examiner

*Primary Examiner*—David H Malzahn
(74) *Attorney, Agent, or Firm*—Schwegman, Lundberg & Woessner, P.A.

(57) ABSTRACT

A processor-executed computational method especially for use in cryptographic systems quickly determines a polynomial quotient under specific conditions. For a polynomial modulus $f(x)$, a maximum degree for a polynomial $i(x)$ to be reduced by this method is defined as the sum of the degree of $f(x)$ and the difference d between the degrees of the two highest degree coefficients of $f(x)$. Polynomials $i(x)$ with degree less than this maximum can be divided by $a\hat{}[deg(f(x))]$ instead of the full $f(x)$ to quickly obtain the quotient value. With this quotient a residue value can be obtained, or optionally a random congruent value.

16 Claims, 1 Drawing Sheet

METHOD FOR FAST QUOTIENT GUESS AND CONGRUENCIES MANIPULATION

TECHNICAL FIELD

The present invention relates to methods or arrangements for processing numerical data by electrical computers and digital processing systems, and in particular relates to arithmetic processing and calculating methods directed to finite field or congruence operations, including integer division operations, especially upon polynomials with binary coefficients.

BACKGROUND ART

In modern cryptographic systems, such as the symmetric block cipher known as Rinjdael (adopted by the U.S. National Institute of Standards and Technology as its Advanced Encryption Standard or AES), blocks of data (bit strings) are subject to numerous substitution and permutation operations, which at a deeper level typically involve byte shifts, XOR additions, and congruence operations upon polynomials (represented as bit strings). Thus, in AES, finite field arithmetic over polynomials in $GF(2^8)$ are performed using $g(x)=x^8+x^4+x^3+x+1$ and $h(x)=x^8+1$ as moduli. Methods of rapidly computing polynomial quotients and residues are desired for efficient operation of these cryptographic systems.

U.S. Pat. No. 6,523,053 to Lee et al. describes a method and apparatus for performing finite field polynomial division. The long polynomial is split into segments or groups, and the partial quotient and remainder are computed in parallel for each group, then combined. This technique is used for large polynomials (of high degree).

U.S. Pat. Nos. 5,615,220 to Pharris and 5,185,711 to Hattori perform finite field division using Euclid's algorithm, which is a technique that involves multiple iterations of divisions. The technique is useful for divisions involving large polynomials.

SUMMARY DISCLOSURE

The present invention is a method that performs fast quotient computations on polynomials for efficient congruence operations where the degree of the polynomial to be reduced is not more than the degree of the polynomial modulus plus the distance between the two highest degrees of coefficients of the modulus minus 1. Thus, for example, where the modulus is $x^8+x^4+x^3+x+1$, with degree 8 and distance 4 between the coefficients of two highest degrees, the quotient computation can be rapidly computed for polynomials up to and including a degree of 11. In particular, in this special case, the lower degrees of the modulus become irrelevant, and the quotient is simply a division of the polynomial by the highest degree term of the modulus. The quotient will have a degree not more than the above-noted distance between the modulus' two highest degree coefficients minus 1.

For binary finite fields $GF(2^n)$, this method is easily implemented in processing hardware by loading the equivalent bit string of the polynomial to be reduced and then right bit shifting the string by a number of bits equal to the degree of the modulus to obtain the quotient. For prime fields $GF(p^k)$, $p>2$, the same basic principles apply, but sets of bits will be manipulated, such as by executing an equivalent firmware or software program in a data processor or computer.

Because finding the quotient is the most computationally intensive part of the reduction operation, the present fast quotient computation allows for fast reduction of the polynomial to its residue, as well as adding to the quotient (without increasing its degree) to obtain other congruences of the polynomial.

DETAILED DESCRIPTION

Figure 1:
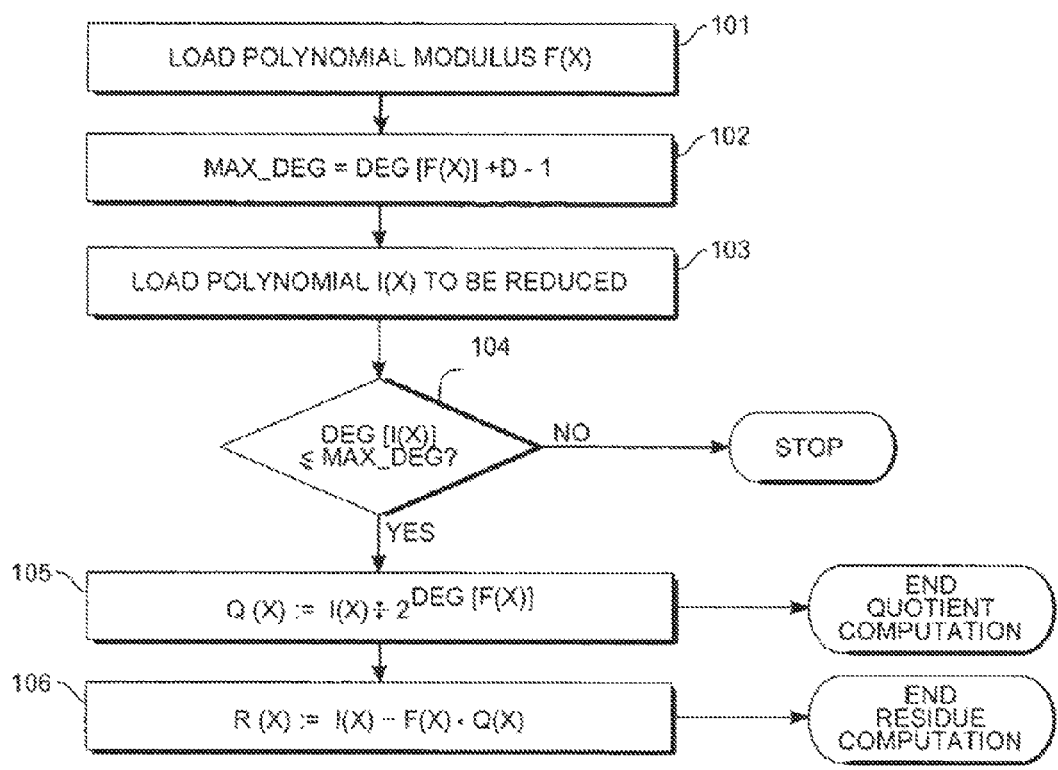
FIG. 1 is a flow diagram of a method of fast quotient computation and fast residue computation in accord with the present invention, for an exemplary case of binary finite fields in $GF(2^n)$.

The fast quotient computation method of the present invention takes advantage for special cases of an inherent property of polynomial operations in a finite field. If we have a polynomial modulus which is of the form, say $f(x)=x^8+x^4+x^3+x+1$ (example given in $GF(2^8)$), one may notice that the degree of $f(x)$ is $\deg[f(x)]=8$ and the distance between the coefficients of two highest degrees minus 1 is $d=3$. Now let $g(x)$ be a polynomial of maximum degree d, $\deg[g(x)]\leq d$. Let $h(x)$ be another polynomial which is the product of $f(x)$ and $g(x)$. That is, $h(x)=g(x)\cdot f(x)=g(x)\cdot x^8+g(x)\cdot x^4+g(x)\cdot x^3+g(x)\cdot x+g(x)\cdot 1$. Because $\deg[g(x)]\leq 3$, we can remark that the degrees of the coefficients of $h(x)$ higher than $\deg[f(x)]=8$ are equal to $g(x)\cdot x^8$. Consequently, if we have a polynomial $i(x)$ to be reduced modulo $f(x)$, with $\deg[i(x)]<\deg[f(x)]+d$, the quotient of the division $i(x)/f(x)$ will be the polynomial division of $i(x)$ by the highest degree term of $f(x)$, i.e. by $x^8$.

EXAMPLE $$f(x) = x^8 + x^4 + x^3 + x + 1$$

$$i(x) = x^{11} + x^8 + x^2 + x + 1$$

$$\deg[i(x)] = 11 \leq \deg[f(x)] + d = (8+3) = 11$$

$$q(x) = i(x)/f(x) = i(x)/x^8 = (x^{11} + x^8)/x^8 = x^3 + 1$$

(This concludes the fast quotient computation.)

$$\begin{aligned}
r(x) &= i(x) - f(x) \cdot q(x) \\
&= i(x) - (x^8 + x^4 + x^3 + x + 1) \cdot (x^3 + 1) \\
&= i(x) - (x^{11} + x^7 + x^6 + x^4 + x^3 + x^8 + x^4 + x^3 + x + 1) \\
&= i(x) - (x^{11} + x^8 + x^7 + x^6 + x + 1) \\
&= (x^{11} + x^8 + x^2 + x + 1) - (x^{11} + x^8 + x^7 + x^6 + x + 1) \\
&= x^7 + x^6 + x^2
\end{aligned}$$

(This completes the residue calculation using the previously obtained quotient). Note that over the binary finite field, we can implement addition and subtraction with a bitwise XOR operation.

Implemented in hardware processors or the like, the polynomials represent strings of bits, where the location of the bits within a string corresponds to the degree of a polynomial coefficient. For the above given example, with leading zeros provided to complete a byte:

f(x)=00000001 00011011
i(x)=00001001 00000111
q(x)=00000000 00001001.

Note that q(x) is simply i(x) shifted to the right by eight bits, which is the equivalent of dividing by $x^8$.

$$f(x) \cdot q(x) = 00001000\ 11011000$$
$$\oplus 00000001\ 00011011$$
$$= 00001001\ 11000011$$

$$i(x) \oplus (f(x) \cdot q(x)) = 00001001\ 00000111$$
$$\oplus 00001001\ 11000011$$
$$= 00000000\ 11000100$$

A hardware multiplier can handle the multiplication of modulus f(x) and quotient q(x).

With reference to FIG. 1, the basic procedure for calculations on polynomials in binary finite fields $GF(2^n)$ is shown in FIG. 1. First, the polynomial modulus is loaded (step 101). The degree is calculated along with the distance d between coefficients of two highest degrees for f(x). This establishes the maximum degree MAX_DEG for polynomials to be reduced by this invention (step 102). A polynomial i(x) to be reduced is loaded (step 103) and a check is performed to ensure that its degree is less than or equal to MAX_DEG (step 104). If not, then the polynomial i(x) is too large for the this procedure. Otherwise, the quotient is quickly calculated (step 105) by division by $2^{DEG[f(x)]}$ or equivalent right shifts by a number of bits equal to the degree of the modulus. This ends the quotient calculation and q(x) can be returned. Normally, however, the quotient is used for polynomial reduction, i.e., residue calculation. The residue r(x) is computed (step 106) by multiplication of the modulus and quotient followed by subtraction from the original polynomial i(x) (equivalent to XOR in binary fields). This completes the residue computation and the residue value can be returned. Optionally, randomization can be inserted on the quotient (after step 105) or on the residue value (after step 106), as described below, for greater security in working with the returned values.

In addition to performing quick quotient computation and quick reduction, we can also compute different congruences of a given polynomial. With a given quotient q(x) of degree less than or equal to d, we can add a random polynomial value s(x) of same or lesser degree to q(x), then recalculate i(x)⊕(f(x)·q(x)) using the altered quotient q'(x)=q(x)+s(x) in place of q(x). Alternatively, once the residue value is found, a random multiple of the modulus can be added to the residue. In many cases, working with different congruences improves security against side-channel cryptographic attacks without affecting the final result. When working with congruences, it may be desired to avoid having congruent values cancel each other out when added together. This can be ensured by quickly computing the quotient with the same modulus for both polynomial values and comparing. Two different polynomials with the same quotient are not congruent.

When working in a prime finite field $GF(p^k)$, the same basic principles of quick quotient calculation and residue calculation apply, except that each polynomial coefficient has a value from 0 to p−1 and is therefore represented by sets of bits instead of individual bits. Additionally, the operation i(x)−p(x)·q(x) can no longer be replaced by an XOR operation. The difference in each coefficient must be calculated using adder hardware.

What is claimed is:

1. A fast quotient estimation method implemented in an electronic digital processing system for performing polynomial operations in a finite field, the method comprising:

(a) determining from a polynomial modulus f(x) a degree Deg[f(x)] of the modulus and a distance d between two largest degree coefficients of the modulus, a maximum degree MAX_DEG={Deg[f(x)]+d−1};
    (b) receiving a polynomial i(x); and
    (c) if a degree Deg[i(x)] of the received polynomial i(x) is less than or equal to MAX_DEG; then dividing i(x) by $a^{Deg[f(x)]}$ where a is an integer to obtain a polynomial quotient q(x)=i(x)/f(x).

2. The method of claim 1, further comprising:

(d) multiplying the quotient q(x) by the modulus f(x) and subtracting from the received polynomial i(x) to obtain a residue value r(x)=i(x)−f(x)·q(x).

3. The method of claim 2, wherein the finite field is a binary field and the subtraction in (d) is a bitwise XOR operation.

4. The method of claim 2, wherein a random multiple of the polynomial modulus is added to the residue after (d).

5. The method of claim 1, wherein a random polynomial of degree less than d is added to the quotient after (c) to obtain a modified quotient q'(x), then:

(d') multiplying the modified quotient q'(x) by the modulus f(x) and subtracting from the received polynomial i(x) to obtain a random value congruent to i(x)mod f(x).

6. The method of claim 1, wherein the finite field is a prime field with a prime number p>2, and wherein coefficients of the polynomials f(x), i(x) and q(x) are integers from 0 to p−1.

7. The method of claim 1, wherein the method is executed in a cryptographic processor.

8. The method of claim 7, wherein the method is performed as part of execution of a symmetric block cipher by said cryptographic processor.

9. A processor-readable medium storing a program executable by an electronic digital processing system, the program stored on said medium causing the electronic digital processing system to perform polynomial operations in a finite field, the polynomial operations executed by the system comprising:

(a) determining, from a polynomial modulus f(x), a degree Deg[f(x)] of the modulus and a distance d between two largest degree coefficients of the modulus, a maximum degree MAX_DEG={Deg[f(x)]+d−1);
    (b) receiving a polynomial i(x); and
    (c) if a degree Deg[i(x)] of the received polynomial i(x) is less than or equal to MAX_DEG, then dividing i(x) by $a^{Deg[f(x)]}$ where a is an integer to obtain a polynomial quotient q(x)=i(x)/f(x).

10. The processor-readable medium of claim 9, wherein the program further causes the processing system to:

(d) multiply the quotient q(x) by the modulus f(x) and subtracting from the received polynomial i(x) to obtain a residue value r(x)=i(x)−f(x)·q(x).

11. The medium as set forth in claim 10, wherein the finite field is a binary field and the subtraction in (d) is a bitwise XOR operation.

12. The medium as set forth in claim 10, wherein the program further causes the processor to add a random multiple of the polynomial modulus to the residue after (d).

13. The medium as set forth in claim 9, wherein the program further causes the processor to add a random polynomial of degree less than d to the quotient after (c) to obtain a modified quotient q'(x), then:

(d') multiply the modified quotient q'(x) by the modulus f(x) and subtract from the received polynomial i(x) to obtain a random value congruent to i(x)mod f(x).

14. The medium as set forth in claim 9, wherein the finite field is a prime field with a prime number p>2, and wherein coefficients of the polynomials f(x), i(x) and q(x) are integers from 0 to p−1.

15. The medium as set forth in claim 9, wherein the polynomial operations are executed by a cryptographic processor reading said medium.

16. The medium of claim 15, wherein the polynomial operations are performed as part of execution of a symmetric block cipher by said cryptographic processor.

\* \* \* \* \*

UNITED STATES PATENT AND TRADEMARK OFFICE
CERTIFICATE OF CORRECTION

| | | |
|---|---|---|
| PATENT NO. | : 7,788,311 B2 | Page 1 of 1 |
| APPLICATION NO. | : 11/442922 | |
| DATED | : August 31, 2010 | |
| INVENTOR(S) | : Vincent Dupaquis | |

It is certified that error appears in the above-identified patent and that said Letters Patent is hereby corrected as shown below:

In column 3, line 25, after "for" delete "the".

In column 4, line 24, in Claim 5, delete "i(x)mod" and insert -- i(x) mod --, therefor.

In column 4, line 43, in Claim 9, delete "d-1);" and insert -- d-1}; --, therefor.

In column 4, line 67, in Claim 13, delete "i(x)mod" and insert -- i(x) mod --, therefor.

Signed and Sealed this

Thirtieth Day of November, 2010

David J. Kappos
*Director of the United States Patent and Trademark Office*